US007746200B2

(12) United States Patent
Meinherz et al.

(10) Patent No.: US 7,746,200 B2
(45) Date of Patent: Jun. 29, 2010

(54) DRIVE DEVICE WITH AN INPUT SHAFT AND AN OUTPUT SHAFT PARTICULARLY FOR DRIVING A CONTACT PIECE OF AN ELECTRICAL SWITCHING DEVICE

(75) Inventors: Manfred Meinherz, Berlin (DE); Jörg Tietze, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 321 days.

(21) Appl. No.: 10/593,122

(22) PCT Filed: Mar. 8, 2005

(86) PCT No.: PCT/DE2005/000444

§ 371 (c)(1),
(2), (4) Date: Sep. 18, 2006

(87) PCT Pub. No.: WO2005/091320

PCT Pub. Date: Sep. 29, 2005

(65) Prior Publication Data

US 2008/0047374 A1 Feb. 28, 2008

(30) Foreign Application Priority Data

Mar. 17, 2004 (DE) ...................... 10 2004 014 162

(51) Int. Cl.
*H01H 3/00* (2006.01)
*H02K 49/00* (2006.01)
*H02P 15/00* (2006.01)

(52) U.S. Cl. ...................................... 335/185; 310/103

(58) Field of Classification Search ......... 310/103–105; 335/185; 200/404
See application file for complete search history.

(56) References Cited

U.S. PATENT DOCUMENTS

| | | | | |
|---|---|---|---|---|
| 2,475,232 | A * | 7/1949 | Giannini | 318/126 |
| 2,481,360 | A * | 9/1949 | Sprenger | 310/100 |
| 2,790,095 | A * | 4/1957 | Peek et al. | 310/103 |
| 2,857,538 | A * | 10/1958 | Cluwen | 310/103 |
| 3,005,070 | A * | 10/1961 | Ovshinsky | 335/207 |
| 3,025,372 | A * | 3/1962 | Benjetsky | 335/207 |
| 4,163,164 | A * | 7/1979 | Pieters | 310/103 |
| 4,240,300 | A | 12/1980 | Tanaka | |
| 5,597,119 | A * | 1/1997 | Gorney et al. | 239/241 |
| 5,717,266 | A * | 2/1998 | Maynard, Jr. | 310/103 |
| 2002/0072033 | A1 | 6/2002 | Bierbaum et al. | |
| 2002/0186647 | A1* | 12/2002 | Her et al. | 369/266 |
| 2005/0206260 | A1* | 9/2005 | Akiyama | 310/104 |

FOREIGN PATENT DOCUMENTS

| | | |
|---|---|---|
| DE | 82 03 014.6 | 8/1984 |
| DE | 100 63 693 C1 | 8/2002 |

* cited by examiner

*Primary Examiner*—Elvin G Enad
*Assistant Examiner*—Alexander Talpalatskiy
(74) *Attorney, Agent, or Firm*—Laurence A. Greenberg; Werner H. Stemer; Ralph E. Locher

(57) ABSTRACT

A drive device has a rotatable driving shaft and a driven shaft. The driving shaft, or input shaft, and the driven shaft, or output shaft, are joined to each other by way of a magnetic coupling. The driven shaft can be blocked in a direction of rotation such that magnetic forces emanating from the magnetic coupling cause the driven shaft to move in a direction opposite that of the direction of blocking. The driven shaft moves in a springing manner.

11 Claims, 2 Drawing Sheets

DRIVE DEVICE WITH AN INPUT SHAFT AND AN OUTPUT SHAFT PARTICULARLY FOR DRIVING A CONTACT PIECE OF AN ELECTRICAL SWITCHING DEVICE

BACKGROUND OF THE INVENTION

Field of the Invention

The invention relates to a drive device with a rotatable input shaft and a rotatable output shaft.

U.S. Pat. No. 4,240,300 has disclosed, for example, a drive device in which helical springs acting as energy stores are compressed by means of a rotatable input shaft. When the drive device is actuated, the energy stored in the compressed helical springs is transferred to an output shaft within a very short time interval. The output shaft serves to transfer a movement to a movable contact piece of a circuit breaker to switch an electrical circuit. In the process, the helical springs are tensioned by means of a slowly running drive device. However, the energy stored in the tensioned helical springs is released suddenly. A wide variety of shafts, gear wheels, levers and rods, which have to be moved, are necessary in order to produce this movement sequence. Owing to the rapid movement, the individual elements of the drive device need to have large dimensions and constitute a complex arrangement.

SUMMARY OF THE INVENTION

The invention is based on the object of designing a drive device of the kind mentioned in the introduction with a simplified construction.

In a drive device of the kind mentioned in the introduction, the object is achieved according to the invention in that the input shaft and the output shaft are connected to one another by means of a magnetic coupling having at least two magnet pairs, wherein a first blocking device limits the ability of the output shaft to rotate in a first direction of rotation, and, after the first blocking device has become effective, owing to magnetic forces emanating from the magnetic coupling a movement of the output shaft takes place in a second direction of rotation opposite to the first.

A magnetic coupling is disclosed, for example, in the KTR publication "Dauermagnetische Syncronkupplung" [Permanent magnet synchronous coupling]. A magnetic coupling allows torque to be transmitted without contact. Magnetic couplings of this kind transmit a continuous rotational movement, for example of a drive motor and to a pump. Because of the contactless transmission of torque, it is possible to provide hermetic separation of the input drive-side and output drive-side. To do this, a so-called split case is arranged between the coupling elements. By means of the split case, it is possible to transmit rotational movements through walls where it is not desirable to make an opening for the purpose of feeding through a rotatable shaft.

The known magnetic coupling transmits the movement of the input shaft directly to the output shaft. This means that the transmission of the driving movement takes place almost without slip.

The magnet pairs each have a north and south pole on the surfaces facing one another so that attractive forces occur between the magnet pairs. The output shaft and the input shaft are coupled to one another and movements can be transmitted by means of these forces. The output shaft is blocked in a first direction of rotation by means of the first blocking device. A blocking device of this kind can be designed, for example, in the form of a stop. The stop forces the associated magnet pairs to be displaced. As a result of this, the input and output shafts, which are usually moved in synchronism with one another, are moved asynchronously with respect to one another. If the offset of the input shaft and the output shaft with respect to one another is sufficiently large that the magnet pair partners associated with one another change owing to the magnetic forces, the output shaft is moved in a second direction of rotation opposite to the first. This enables a reversal in the direction of rotation between the input shaft and the output shaft to be produced easily by means of a magnetic coupling. As only the magnetic coupling itself is necessary for this, the use of reversing gears or similar can be dispensed with. This results in a very compact and light arrangement.

Here, it can be advantageously arranged that the input shaft is moved and continues to be moved when the output shaft is blocked.

The speed of the reversal of the direction of rotation can be easily affected by a further movement of the input shaft. An additional acceleration of the input shaft after the first blocking device has become effective also causes a rapid reversal of the direction of movement. It is particularly advantageous if, at the beginning of the rotational movement of the input shaft, the output shaft is already prevented by the blocking device from moving in the first direction of rotation. This makes it possible for the reversal of the rotational movement to be initiated immediately.

Furthermore, it can be especially advantageously arranged that the transition to the second direction of rotation of the output shaft takes place suddenly.

By utilizing a sudden movement of the output shaft in the second direction of rotation, it is possible to use the drive device for switching devices with high switching speeds, for example. In switching devices such as high-voltage high-speed grounding switches, for example, it is necessary to switch these very quickly in order to prevent the formation of switching arcs. Previously, therefore, energy storage devices, for example compression springs or hydraulic storage devices, have been used to release a high driving energy precisely. A sudden rotational movement of the output shaft can now be produced by using a drive device with a magnetic coupling according to the invention. Additional energy storage devices are not required, as the magnetic forces that can be produced by the magnetic coupling are utilized. This makes it possible for a continuous, comparatively slow driving movement to be converted into a short, fast driven movement.

Furthermore, it can be advantageously arranged that a second blocking device causes a reversal of the movement of the output shaft from the second to the first direction of rotation.

By providing a second blocking device, it is now possible to rotate the output shaft backwards and forwards between the first and the second blocking device. In this way, a certain angle of rotation of the output shaft can be provided, for example.

This angle of rotation can be 45°, 60°, 72° or 90°, for example. The position of the blocking devices with respect to the output shaft must be chosen accordingly.

A further object of the invention is to specify a suitable method for operating a magnetic coupling, which couples an input shaft and an output shaft to one another.

According to the invention, in a method for operating a magnetic coupling, it is intended that the input shaft be moved, the output shaft be blocked in a first direction of rotation, the input shaft be moved further, and the output shaft be moved suddenly in a second direction of rotation, which is opposite to the first direction of rotation.

As a result of the method according to the invention, it is possible to convert a continuous rotational movement into a suddenly acting rotational movement by using a magnetic coupling. Here, an attempt is first made to use the input shaft to move the output shaft in a first direction of rotation in which it is blocked. When the input shaft moves further, the output shaft is rotated in a second direction of rotation, which is opposite to the first direction of rotation. In this way, it is possible to use a magnetic coupling for reversing a rotational movement.

Furthermore, it can be advantageously arranged that a drive device with the characteristics described above be employed to use the movement of the output shaft for driving a movable contact piece of an electrical switching device.

In high-voltage engineering, i.e. at voltage levels from 10 000 volts, in particular from 70 000 volts, switching devices are used, whose contact pieces have to be moved suddenly. Examples of such switching devices are circuit breakers, high-speed grounding switches and also load interrupter switches. The contact piece has to be moved from its off position to the on position or vice versa within very short periods of time, i.e. within fractions of a second. Conventional transmissions such as hydraulic transmissions or mechanical transmissions with toothed elements are subject to increased wear as a result of the suddenly occurring movements. The use of a drive device with magnetic coupling according to the invention allows high driving forces to be transmitted while only a small amount of mechanical wear takes place. Furthermore, it has previously been common to provide complex energy storage devices, such as compression springs or hydraulic storage devices or compressed air storage devices, in order to provide large amounts of energy within short periods of time for moving the contact pieces. The drive device according to the invention now allows relatively slowly running continuously acting drives to be used and a sudden type of movement to be produced at the output shaft. This means that cost-intensive energy storage devices can be dispensed with. A further advantage with magnetic couplings according to the invention is that appropriate split cases can be used, which penetrate the magnetic gap of the coupling and therefore make it possible for the input-drive and output-drive side of the drive device to be hermetically separated. In order to achieve high dielectric strengths, electrical switching devices in the high-voltage field are often arranged in gas-tight encapsulated housings, which are filled with an insulating gas under elevated pressure. By using a so-called split case, it is now possible to transmit a driving movement through the wall of an encapsulated housing. As a result of this, the elaborate gas-tight sealing of shafts fed rotatably through the wall of the encapsulated housing can be dispensed with.

In the following, the invention is shown schematically in a drawing and described in more detail with reference to an exemplary embodiment.

DESCRIPTION OF THE PREFERRED EMBODIMENTS

Figure 1:
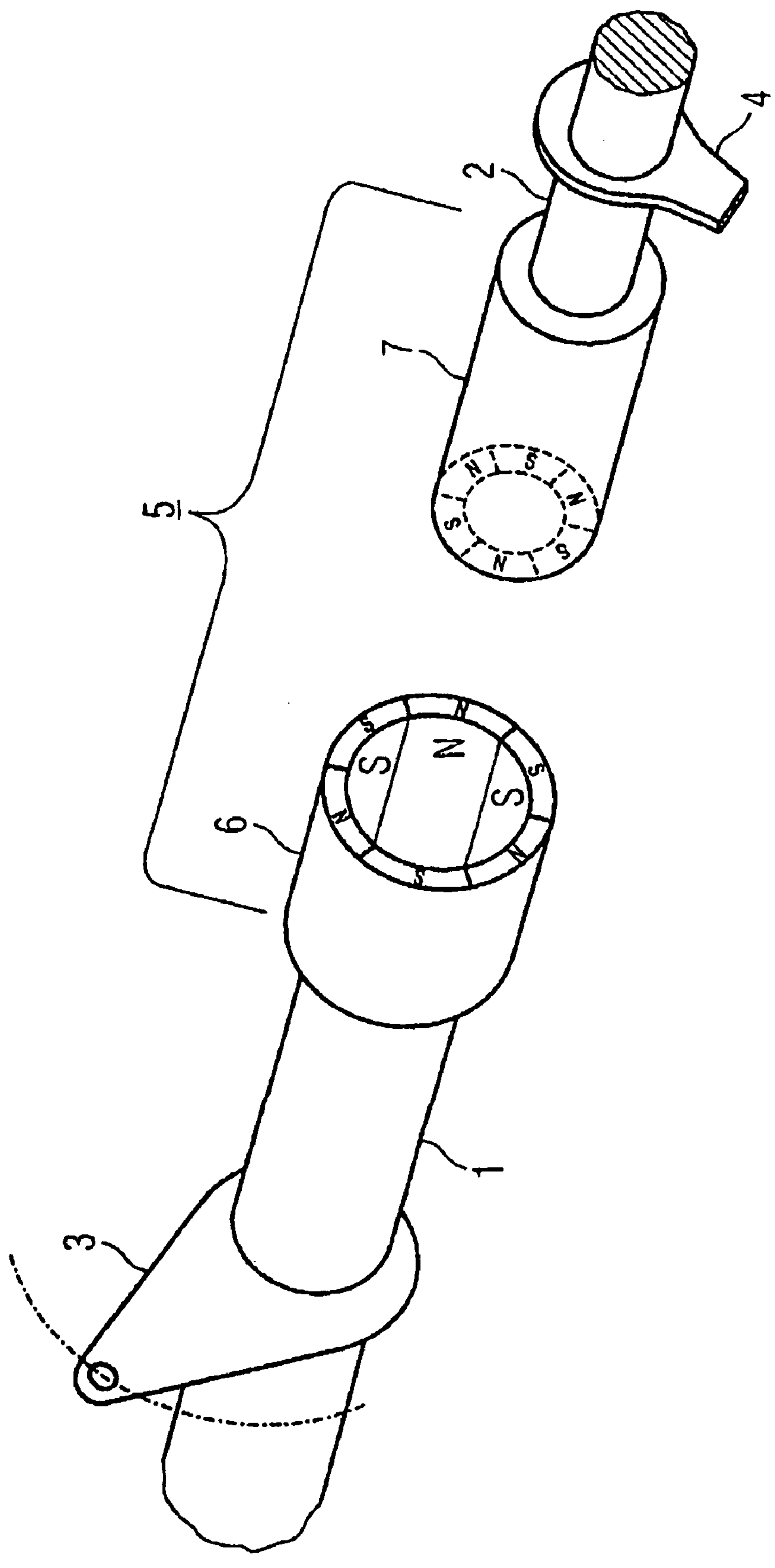
FIG. 1 shows the schematic construction of an input shaft and an output shaft with a magnetic coupling.

FIG. 1 shows a drive device with an input shaft 1 and an output shaft 2. The input shaft 1 and the output shaft 2 are each rotatably mounted. A rotational movement can be imposed upon the input shaft 1 by means of a drive lever 3. A blocking lever 4 is arranged on the output shaft 2. The input shaft 1 and the output shaft 2 are arranged coaxially with respect to one another so that their faces are opposite to one another. A magnetic coupling 5 is arranged on their facing ends. The magnetic coupling 5 has an input drive-side coupling element 6 and an output drive-side coupling element 7. The input drive-side coupling element 6 is arranged on the input shaft 1. The output drive-side coupling element 7 is arranged on the output shaft 2. The input drive-side coupling element 6 is designed as a hollow cylinder. A multiplicity of magnets is arranged radially on the circumference of the input drive-side coupling element 6. These magnets are preferably permanent magnets. At the same time, the radial distribution is chosen in such a way that north and south poles of the magnets are arranged alternately radially around the inner sheath surface of the hollow-cylindrical input drive-side coupling element 6. The output drive-side coupling element is cylindrical and has a diameter such that it can be moved into the hollow-cylindrical input drive-side coupling element 6. The output drive-side coupling element 7 has north and south poles of magnets each radially distributed alternately on its outer sheath surface. At the same time, the radial distribution of the magnets on the input drive-side coupling element 6 and the output drive-side coupling element 7 is chosen to be in the form of sectors in such a way that, when the output drive-side coupling element 7 is moved into the input drive-side coupling element 6, a multiplicity of magnet pairs is formed which are clearly associated with one another by means of the magnetic forces.

FIG. 1 shows the magnetic coupling 5 in a decoupled state. The two coupling elements 6, 7 must be inserted one into the other for the magnetic coupling 5 to become effective. The coupling elements 6, 7 can be designed, for example, in accordance with the magnetic coupling disclosed in the KTR publication "Dauermagnetische Synchronkupplung" [Permanent magnet synchronous coupling].

In addition, it is also conceivable for other different embodiments of magnetic couplings to be used. For example, it is possible to use coupling elements that to be arranged so as to face one another in order to achieve a coupling effect, and else coupling elements that enable an arrangement of the axes of rotation of the coupling elements other than a coaxial arrangement. Examples of arrangements of this kind are parallel axes of rotation (the magnet poles are then each located radially on the external circumference of the coupling elements) or else axes of rotation that are at an angle to one another in the manner of a bevel gear.

Figure 2:
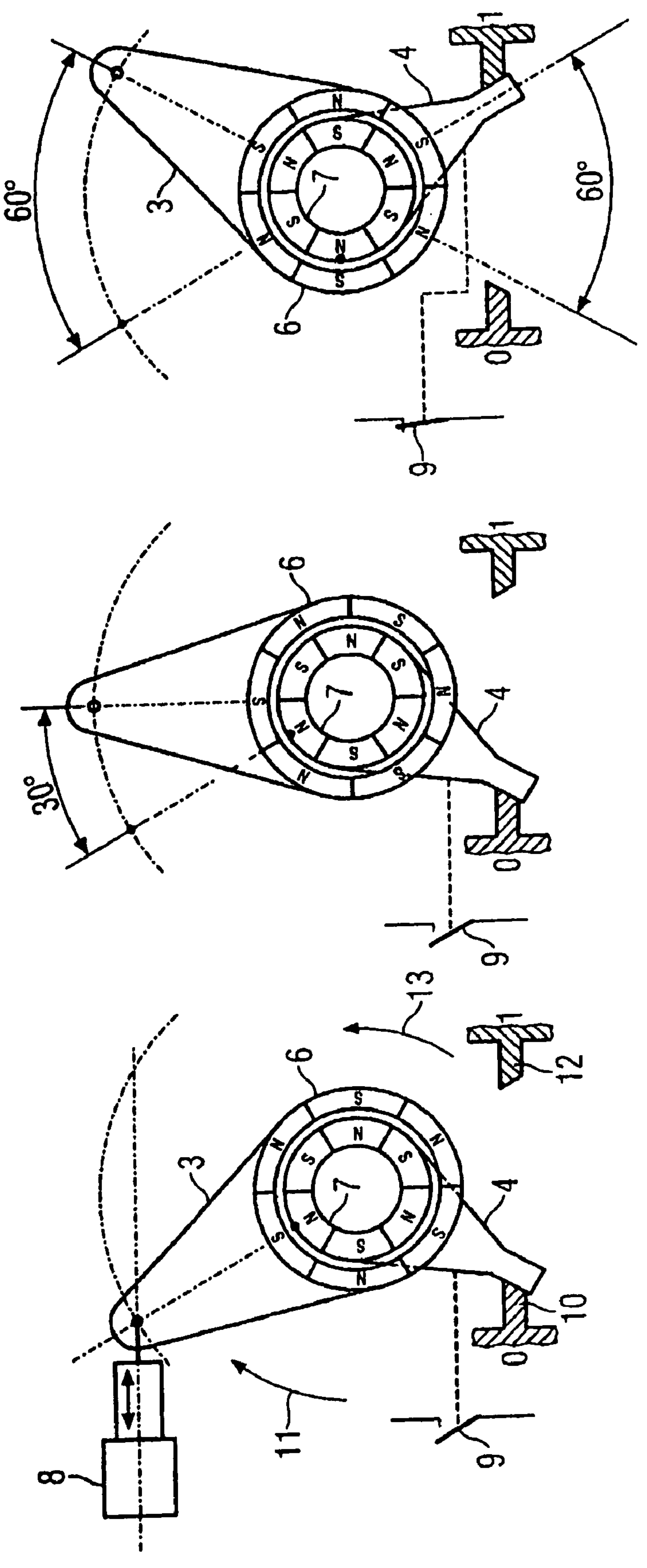
FIG. 2 shows the sequence involved in a method according to the invention.

FIG. 2 shows a sectional view through the magnetic coupling 5 wherein the input drive-side coupling element 6 encloses the output drive-side coupling element 7, as a result of which the respective magnet pairs can exert a force effect on one another. The coupling of a drive device 8 to the drive lever 3 is shown schematically. The drive device 8 can be an electric motor drive, for example, in particular an electromagnetic linear drive. An electrical switching device 9 is also shown symbolically in FIG. 2. The electrical switching device 9 has a movable contact piece, which is connected to the blocking lever 4, shown schematically. The translation of the driving movement to the switching movement can be adjusted by changing the lengths of the drive lever 3 as well as the lever arm on the blocking lever 4. The electrical switching device 9 can in particular be a grounding switch or a high-speed grounding switch in the field of electrical high-voltage engineering. A rotational movement of the output shaft 2 in a first direction of rotation 11 is limited by means of a first blocking device 10 via the blocking lever 4. The ability of the output shaft to move in a second direction of rotation 13 is limited by means of a second blocking device 12. The first blocking device 10 and the second blocking device 12 are designed in the form of mechanical stops against each of which the blocking lever 4 strikes alternately. The possible angle of rotation of the output shaft 2 is limited by the arrangement of the blocking devices 10, 12.

In the interests of simplifying the diagram, only the poles of the magnet pairs necessary for transmitting the movement are shown. In the coupling elements 6, 7 shown in FIG. 2, six magnet pairs have been evenly distributed radially on the circumferences. This results in a switching angle of 60°. As a deviation from this, four magnet pairs, five magnet pairs or eight magnet pairs can also be used, resulting in switching angles of 90°, 72° and 45°. A movement sequence of the drive arrangement shown in FIG. 2 is described in the following wherein the movable contact piece of the electrical switch 9 is moved suddenly from an off position "0" into an on position "1". The drive device 8 moves the drive lever 3 and thus the input shaft 1 as well as the input drive-side coupling element 6 in the first direction of rotation 11. The blocking lever 4 fixed to the output shaft 2 bears against the first blocking device 10. Owing to the attractive force effect between the magnet pairs on the input drive-side coupling element 6 and on the output drive-side coupling element 7, the blocking lever 4 is pressed against the first blocking device 10. The input shaft 1 is moved further by means of the drive lever 3. When half the switching angle has been reached, 30° in the present example, a transition position of the magnetic coupling 5 is reached. This means that the magnet pairs are arranged so as to be displaced with respect to one another by approximately half of the effective pole faces. If the drive lever 3 is moved further in the first direction of rotation 11, pole faces of the same polarity overlap one another to an ever-increasing extent. Magnets of the same polarity repel one another. When a critical position is reached, the repelling forces are sufficiently large that the blocking lever 4 with the output shaft 2 is moved suddenly in the second direction of rotation 13. The blocking lever 4 strikes against the second blocking device 12 in this direction of rotation.

During the movement, the blocking lever 4 is initially pressed against the first blocking device 10 owing to the attractive magnetic forces of the magnet pairs of unequal polarity. The repelling forces of pole faces of the same polarity are utilized during a further phase of the movement of the input shaft 1.

The blocking lever 4 moves back from the second blocking device 12 to the first blocking device 10 in the same manner.

Magnet pairs with different magnet poles lie opposite one another in the end positions of the blocking lever 4 both when the blocking lever 4 strikes the first blocking device 10 and also when the blocking lever 4 bears against the second blocking device 12, with the result that a stable position of the output shaft is automatically produced owing to the force effect of the magnetic coupling.

When a split case is used which is placed in the gap between the input drive-side coupling element 6 and the output drive-side coupling element 7, the driving movement can also be transmitted through a closed wall. At the same time, the wall can be an encapsulated housing of a compressed gas-insulated switchgear assembly or a compressed gas-insulated switching device, for example. In this case, the split case is part of the wall.

We claim:

1. A drive device, comprising:
- a rotatable input shaft and a rotatable output shaft;
- a blocking lever connected with said output shaft;
- a magnetic coupling connecting said input shaft and said output shaft, enabling a reversal in direction of rotation between said input shaft and said output shaft;
- a first blocking device disposed only to limit a rotatability of said output shaft in a first direction of rotation by obstructing movement of said blocking lever, said first blocking device being operational, and as a function of magnetic forces emanating from said magnetic coupling, to cause said output shaft to rotate in a second direction of rotation opposite to the first direction of rotation; a second blocking device being disposed to cause a reversal of a movement of said output shaft from the second direction of rotation to the first direction of rotation; and said output shaft having only rotational movement in the first and second directions.

2. The drive device according to claim 1, wherein said input shaft is moved and continues to be moved when said output shaft is blocked.

3. The drive device according to claim 1, wherein a transition to the second direction of rotation of said output shaft is a substantially sudden transition.

4. A method of operating a magnetic coupling disposed to couple an input shaft with an output shaft, which comprises the steps of: providing a drive device according to claim 1;
- moving the input shaft;
- blocking the output shaft only in a first direction of rotation;
- moving the input shaft further; and
- suddenly moving the output shaft in a second direction of rotation, opposite the first direction of rotation, the output shaft being only rotatable in the first and second directions of rotation.

5. The method according to claim 4, which comprises the further step of: driving a contact piece of an electrical switching device with the output shaft.

6. In combination with an electrical switching device, the drive device according to claim 1, wherein said output shaft is configured to drive a movable contact piece of an electrical switching device.

7. The drive device according to claim 1, wherein and said first blocking device is disposed for releasable engagement with said blocking lever such that said first blocking device is operational only prior to movement of said output shaft in the second direction.

8. The drive device according to claim 1, wherein said a second blocking device is disposed for releasable engagement with said blocking lever at the end of limited rotational movement of said output shaft in the second direction of rotation, said first blocking device having no blocking effect during rotational movement in the second direction.

9. The drive device according to claim 1, wherein said first blocking device is operational only prior to movement of said output shaft in the second direction of rotation.

10. The drive device according to claim 1, wherein, said first and second blocking devices are operational to provide a blocking effect only prior to movement of said output shaft in the second and first directions of rotation, respectively.

11. A drive device, comprising:
- a rotatable input shaft and a rotatable output shaft;
- a blocking lever connected with said output shaft;
- a magnetic coupling connecting said input shaft and said output shaft, said magnetic coupling having at least two magnet pairs and enabling only a reversal in direction of rotation between said input shaft and said output shaft;

a first blocking device being in releasable blocking contact with said blocking lever only to limit a rotatability of said output shaft in a first direction of rotation, said first blocking device being operational, and as a function of magnetic forces emanating from said magnetic coupling, to disengage said blocking lever to cause said output shaft to rotate in a second direction of rotation opposite to the first direction of rotation and being non-operational to provide blocking contact during the second direction of rotation; a second blocking device being disposed for causing a reversal of a movement of said output shaft from the second direction of rotation to the first direction of rotation; and said output shaft having only rotational movement in the first and second directions.

* * * * *